(12) United States Patent
Will (10) Patent No.: US 10,411,887 B2
(45) Date of Patent: Sep. 10, 2019

(54) DOCUMENT META-DATA REPOSITORY

(71) Applicant: ESI Laboratory, LLC, Fresh Meadows, NY (US)

(72) Inventor: Michael Alistair Will, New York, NY (US)

(73) Assignee: ESI LABORATORY, LLC, Fresh Meadows, NY (US)

( * ) Notice: Subject to any disclaimer, the term of this patent is extended or adjusted under 35 U.S.C. 154(b) by 278 days.

(21) Appl. No.: 15/361,440

(22) Filed: Nov. 27, 2016

(65) Prior Publication Data

US 2017/0085376 A1    Mar. 23, 2017

Related U.S. Application Data

(63) Continuation of application No. PCT/US2015/032939, filed on May 28, 2015.

(60) Provisional application No. 62/004,065, filed on May 28, 2014.

(51) Int. Cl.
| | |
|---|---|
| *H04L 9/08* | (2006.01) |
| *G06F 16/93* | (2019.01) |
| *G06F 21/60* | (2013.01) |
| *H04L 29/06* | (2006.01) |
| *H04L 9/06* | (2006.01) |

(52) U.S. Cl.
CPC .......... *H04L 9/0861* (2013.01); *G06F 16/93* (2019.01); *G06F 21/606* (2013.01); *H04L 9/0643* (2013.01); *H04L 63/0245* (2013.01); *H04L 63/1408* (2013.01)

(58) Field of Classification Search
None
See application file for complete search history.

(56) References Cited

U.S. PATENT DOCUMENTS

| | | | |
|---|---|---|---|
| 7,519,589 B2 | 4/2009 | Charnock et al. | |
| 7,698,298 B2 | 4/2010 | Ciaramitaro et al. | |
| 7,716,196 B2 | 5/2010 | Ghielmetti et al. | |
| 8,165,974 B2 | 4/2012 | Privault et al. | |
| 8,296,309 B2 | 10/2012 | Brassil et al. | |
| 8,549,309 B1 * | 10/2013 | Zhao | G06F 21/64 713/176 |
| 8,645,401 B2 | 2/2014 | Williams et al. | |

(Continued)

OTHER PUBLICATIONS

Rivest et al., "The MD5 Message-Digest Algorithm", MIT Laboratory for Computer Science and RSA Data Security, pp. 3-6, Apr. 30, 1992.

(Continued)

*Primary Examiner* — Christopher A Revak
(74) *Attorney, Agent, or Firm* — Myers Wolin, LLC (57) ABSTRACT

A computer based method of protecting sensitive documents is provided, the method comprising identifying a first document, generating a registration key associated with the first document, identifying a second document, generating a production key associated with the second document, and producing an alert if a segment of the production key is identical to a segment of the registration key. For example, the registration key may comprise a digital fingerprint and registration metadata and the production key may comprise a digital fingerprint and production metadata, and the method may produce an alert of the digital fingerprint of the production key matches the digital fingerprint of the registration key.

17 Claims, 5 Drawing Sheets

(56) References Cited

U.S. PATENT DOCUMENTS

| | | | |
|---|---|---|---|
| 8,677,132 B1* | 3/2014 | Liao | H04L 9/0894 |
| | | | 713/176 |
| 2007/0110089 A1* | 5/2007 | Essafi | H04L 29/06 |
| | | | 370/420 |
| 2009/0150169 A1* | 6/2009 | Kirkwood | G06Q 10/00 |
| | | | 705/342 |
| 2010/0077301 A1 | 3/2010 | Bodnick et al. | |
| 2012/0192286 A1* | 7/2012 | Messing | G06F 17/30011 |
| | | | 726/27 |
| 2013/0227714 A1 | 8/2013 | Gula et al. | |
| 2013/0247221 A1* | 9/2013 | Victor | H04L 63/10 |
| | | | 726/28 |

OTHER PUBLICATIONS

Eastlake et al., "US Secure Hash Algorithms (SHA and SHA-based HMAC and HKDF)", pp. 1-127, May 7, 2011.

European Search Report, dated Dec. 1, 2017, for corresponding European Application No. 15800574.4.

Robinson, "Considering Meet and Confer", Orange Legal Technologies, URL: <http://www.jdsupra.com/post/documentViewer.aspx?fid=e727118b-1748-43f2-a843-da5b30c6d843>, pp. 1-44, Jun. 16, 2009.

O'Neill et al., "DISCO: Intelligent Help for Document Review", Workshop DESI at ICAIL 2009, Document No. 2009/036, Barcelone, Spain, Jun. 8, 2008.

* cited by examiner

FROM: firstname.lastname@esilaboratory.com
TO: solicitor.advocate@englishlawfirm.uk
CC: associate.solicitor@englishlawfirm.uk
DATE: May 26, 2014
SUBJECT: ESILAB DOCUMENT META DATA REPOSITORY ALERT - PRODUCER VARIANT Dear Sirs, You are about to produce the following media which has been registered by a third party as Sensitive Material Media in the ESILAB DMR.

High Court, Queen's Bench Division
Claim No. HQ08X01759
BETWEEN
East Coast Plaintiff PLC
and
Welsh Defendant Limited

| No. | File Name | File Size | Bates Range | Digital Fingerprint |
|---|---|---|---|---|
| 005 | PRO-00000025.xls | 135168 | PRO-00000000003- PRO-00000000003 | 91c65fa7d58dd7550f30fa44b86249522a718a33 |
| 013 | PRO-00000036.jpg | 312083 | PRO-00000000008- PRO-00000000008 | 3f32fc9e7abfc654cfeff72e43a1dacfae3ca1da |
| 030 | PRO-00000015.pdf | 895126 | PRO-00000000027- PRO-00000000027 | 1883c9bd8bb85388208360d68379df8c1c2162bf |
| 362 | PRO-00014859.MSG | 24576 | PRO-00000000002- PRO-00000000002 | e45316fae1cb29389942705ae8a9d057e1199488 |
| 363 | PRO-00014860.MSG | 25088 | PRO-00000000004- PRO-00000000004 | 946e2bc6b1b2e3c69acb711384813ab73cbf6960 |
| 364 | PRO-00014861.MSG | 25088 | PRO-00000000005- PRO-00000000005 | b063bb8b57380b45ca86ca50104d939b070985cc |
| 365 | PRO-00014862.MSG | 24576 | PRO-00000000006- PRO-00000000006 | 342f8f2d1f0303be810eebb0fca00ad03c3f998a |
| 366 | PRO-00014863.MSG | 25088 | PRO-00000000007- PRO-00000000007 | 4c6f03f99835fd450e12dd05396423ec2d8af066 |
| 464 | PRO-00015667.doc | 65024 | PRO-00000000041- PRO-00000000041 | 8f894b2e90cea2c3978acb089306dc1edf195fa7 |
| 465 | PRO-00015668.DOC | 56823 | PRO-00000000042- PRO-00000000042 | db10f91d00fc64d227aa5f7f73ffb0fa44d7dc40 |
| 466 | PRO-00015669.doc | 76288 | PRO-00000000043- PRO-00000000043 | d70ef1daa12e77ca056dcbb77645b5b1eadc95bf |
| 467 | PRO-00015670.DOC | 63021 | PRO-00000000044- PRO-00000000044 | ca96fe53a9ee742648dc05a01b8bde413cd995cb |
| 469 | PRO-00015674.xls | 83968 | PRO-00000000046- PRO-00000000046 | a50479fc55be0bb2514f1edb871c62c93b4316df |
| 470 | PRO-00015680.doc | 34816 | PRO-00000000047- PRO-00000000047 | 7123a0fec4d44615c1768a5f5941264b26e1306a |
| 478 | PRO-00015677.doc | 210432 | PRO-00000000049- PRO-00000000049 | b9623fc1cd4165b75075b5798d64e05631212693 |
| 479 | PRO-00015860.MSG | 19968 | PRO-00000000045- PRO-00000000045 | 003d7616e9b1023702307075bd12702c1d27b812 |
| 480 | PRO-00015861.MSG | 17920 | PRO-00000000048- PRO-00000000048 | eab3c3e359f92158f468fb1c5ebf79aa12b109c2 |
| 482 | PRO-00016359.xls | 60928 | PRO-00000000050- PRO-00000000050 | 24e023bd17be19b0a9b85113b746b86c0d1d6e33 |
| 483 | PRO-00016360.xls | 60928 | PRO-00000000051- PRO-00000000051 | 6e5f646661cc24df27ee7e81b5625dd9b56613d2 |
| 484 | PRO-00016359.xls | 60928 | PRO-00000000050- PRO-00000000050 | 24e023bd17be19b0a9b85113b746b86c0d1d6e33 |
| 487 | PRO-00016360.xls | 60928 | PRO-00000000051- PRO-00000000051 | 6e5f646661cc24df27ee7e81b5625dd9b56613d2 |
| 507 | PRO-00022111.ppt | 348672 | PRO-00000000056- PRO-00000000056 | 94c0c236a4a9906d52d64ee680308b5109812644 |
| 515 | PRO-00015862.MSG | 2644992 | PRO-00000000057- PRO-00000000057 | 02ae89add28dc4fa08c16e2b2af3955ba73010ce |

Please call ESILAB ( +1 646 555 1234 ) for further details and quote the following reference - Case No. 12 Civ. 7312 (DLC) - in order to definitively determine the true status of the media in question.

Yours faithfully,

ESI Laboratory, LLC

FIG. 4

DOCUMENT META-DATA REPOSITORY

CROSS-REFERENCE TO RELATED APPLICATION

This application is a continuation under 35 U.S.C. § 120 of International Application PCT/US2015/032939, filed May 28, 2015, which claims the benefit of U.S. Provisional Patent Application No. 62/004,065, filed May 28, 2014, the contents of each of which are incorporated by reference herein in its entirety.

FIELD OF THE INVENTION

The invention is related to a repository for media file meta-data and methods for increasing the security of sensitive media items (including but not limited to documents) by (i) preventing unauthorized or inadvertent disclosure and/or transmission of media files produced by during the course of legal and regulatory proceedings; and (ii) preventing unauthorized or inadvertent disclosure and/or transmission of sensitive media files created during the normal course of business by commercial and government entities.

BACKGROUND

When multiple reviewers collaborate on classifying media items, such as documents or other data files, different reviewers may classify identical media items differently. For example, where attorneys review documents in advance of a document production during discovery/disclosure, a first attorney in a first jurisdiction may mark a document as privileged, confidential, or otherwise sensitive, while a second attorney in a second jurisdiction may mark the same document for disclosure. Further, once documents are classified as privileged, confidential or otherwise sensitive, there may be a need to control or monitor access or distribution of those documents, imposed by a court protective order restricting access to documents produced as part of the discovery/disclosure process. The inadvertent or unauthorized distribution of a document originally considered privileged or confidential, whether intentionally or accidentally, could have disastrous effects.

As legal/regulatory proceedings become more complex and discovery/disclosure processes include more and more documents, the risk of inadvertent or unauthorized disclosure of confidential documents, or otherwise providing inconsistent disclosures, is exacerbated. Such inconsistent disclosures can lead to loss of reputation, court sanctions, malpractice proceedings, unhappy clients, and professional misconduct proceedings, among other problems.

These problems may arise because clients do not always instruct the same set of lawyers to represent them in complex proceedings (which are often multi-jurisdictional), or because different firms represent clients in different actions in which an overlapping set of documents are involved. Similarly, a single firm may assign different legal teams and different lawyers to review documents for different matters, or different parts of a single matter. Any time different attorneys or different legal teams review the same discovery materials, there is likely to be at least some degree of inconsistency in decisions involving privileged, confidential or otherwise sensitive documents.

Further, in some cases, sensitive materials may appear in the form of a cross-reference to a document containing sensitive materials. In such a scenario, the document containing the cross reference may require classification as confidential or sensitive, or may instead require redaction prior to disclosure.

There is a need, therefore, for a platform that can alert users to actual or potential inadvertent or unauthorized disclosure of confidential documents in the corporate, governmental, and legal arenas. Such distribution of sensitive documents may be deliberate or inadvertent arising out of dishonest or negligent acts or inconsistent classifications across multiple classification processes.

In addition to legal/regulatory proceedings, other contexts in which such unauthorized or inadvertent disclosures of confidential materials must be prevented exist as well. In contexts other than litigation (for example the activities of commercial and government entities), such unauthorized or inadvertent disclosures could result in the releasing of trade secrets (in the case of commercial entities), state secrets (in the case of government entities) or otherwise confidential documents. Accordingly, in a corporate or government environment in which confidential documents are created, accessed and transmitted, there is a need for a platform that can provide alerts when a document that may be confidential or otherwise sensitive, is removed (or about to be removed) from the specified environment. There may be a further need for such a platform that can generate alerts for a variety of suspicious activities related to such confidential documents, such as the copying (in whole or in part) of such documents to thumb drives, downloading/uploading to file sharing sites or the emailing or other transmission of such documents and in such circumstances quarantine the relevant sensitive media item or document.

SUMMARY

A computer based method of protecting sensitive documents is provided, the method comprising identifying a first document, generating a registration key associated with the first document, identifying a second document, generating a production key associated with the second document, and producing an alert if a segment of the production key is identical to a segment of the registration key. For example, the registration key may comprise a digital fingerprint and registration metadata and the production key may comprise a digital fingerprint and production metadata, and the method may produce an alert of the digital fingerprint of the production key matches the digital fingerprint of the registration key.

Typically, the digital fingerprint is produced using the same method or algorithm for both the generation of the registration key and the generation of the production key. In some embodiments, different methods may be utilized, but the different methods produce identical results.

In some embodiments, the first document is a member of a first set of documents, such as a set of documents defined as confidential or sensitive, and the second document is a member of a second set of documents, such as a set of documents defined as not-confidential or not-sensitive. The identification of the documents as members of their respective sets, or the definition of the sets, may be by a first user at a first user interface device applying definitions to the first document and a second user at a second user interface device applying definitions to the second document. Accordingly, the identification of the documents as members of the sets may be by different users.

The method may be performed in a bulk or batch process. Accordingly, the first set of documents and the second set of documents may be defined, multiple documents, including the first document, may be classified as part of the first set of documents, and multiple documents, including the second document, may be defined as part of the second set of documents. Registration keys may then be generated for each member of the first set of documents, and production keys may then be generated for each member of the second set of documents, and each production key generated for the documents of the second set may be compared to each registration key generated for the documents of the first set. In such an embodiment, the method may produce an alert if any of the digital fingerprints of the production keys match any of the digital fingerprints of the registration keys. In such an embodiment, the alert may be a listing of any documents having the digital fingerprint of its production key matching the digital fingerprint of any registration key.

The alerts generated may include identifying information for identifying each document that triggered a match on the basis of the production key in both the first set of documents and the second set of documents.

The implementation of the method may be in association with an event, such as a specific litigation. As such, each document may be associated with an event, and any alert generated may then be transmitted to a user associated with the event associated with the second document.

The digital fingerprint may be generated by a cryptographic hash function that takes as input a portion of the corresponding document, and may contains less information than the first document.

In some embodiments, the documents may be related to legal actions, and the first document may be associated with a first legal action by defining a corresponding first action key. The second document may similarly be associated with a second legal action by defining a second action key, and the alert may be generated only if the first legal action is associated with the second legal action.

In some embodiments, the first document may be a member of a first set of documents marked as sensitive and the second document is a document being modified or distributed. In such an embodiment, the generation of the production key may be triggered as a result of one of: transferring the second document to a flash drive, uploading the second document to a website, transmitting the second document by email, or downloading the document to a personal computer.

The methods described may be implemented in a system comprising a server, a database, a first user interface device, and a second user interface device, where the first document is identified at the first user interface device, the first user interface device generates the registration key comprising the digital fingerprint and metadata for the first document, and transmits the registration key to the server. The server then stores the registration key and the metadata for the first document at the database. The second document is then identified at the second user interface device, and the second user interface device generates the production key comprising the digital fingerprint and metadata for the second document and transmits the production key to the server. The server then produces an alert if the digital fingerprint of the production key is identical to any digital fingerprint of a registration key stored in the database.

BRIEF DESCRIPTION OF THE DRAWINGS

FIG. 4 is a sample file including a table of warnings triggered by the method of FIG. 3.

DETAILED DESCRIPTION OF THE PREFERRED EMBODIMENTS

The description of illustrative embodiments according to principles of the present invention is intended to be read in connection with the accompanying drawings, which are to be considered part of the entire written description.

The features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

This disclosure describes the best mode or modes of practicing the invention as presently contemplated. This description is not intended to be understood in a limiting sense, but provides an example of the invention presented solely for illustrative purposes by reference to the accompanying drawings to advise one of ordinary skill in the art of the advantages and construction of the invention. In the various views of the drawings, like reference characters designate like or similar parts.

Specifically, the invention comprises a method for increasing the security of sensitive media items, such as documents marked as privileged and/or confidential, and can be used in discovery/disclosure procedures for litigation and in commercial and government entities generating commercial or state secrets, in each case where large quantities of media items are created and/or disclosed, and wherein large quantities of such media items may be classified as either sensitive or not sensitive.

When multiple reviewers, such as attorneys, collaborate on classifying media items, such as documents or other data files, different reviewers may classify identical media items differently, leading a first attorney to mark a document as confidential while a second attorney, such as an attorney in a related case in a different jurisdiction, marks an identical document as for disclosure.

To protect against such inconsistent disclosures, which can lead to loss of reputation, court sanctions, malpractice proceedings, unhappy clients, and professional misconduct proceedings, among other problems, a method is provided to coordinate the classification of media items by multiple reviewers across various related or unrelated matters.

Figure 1A:
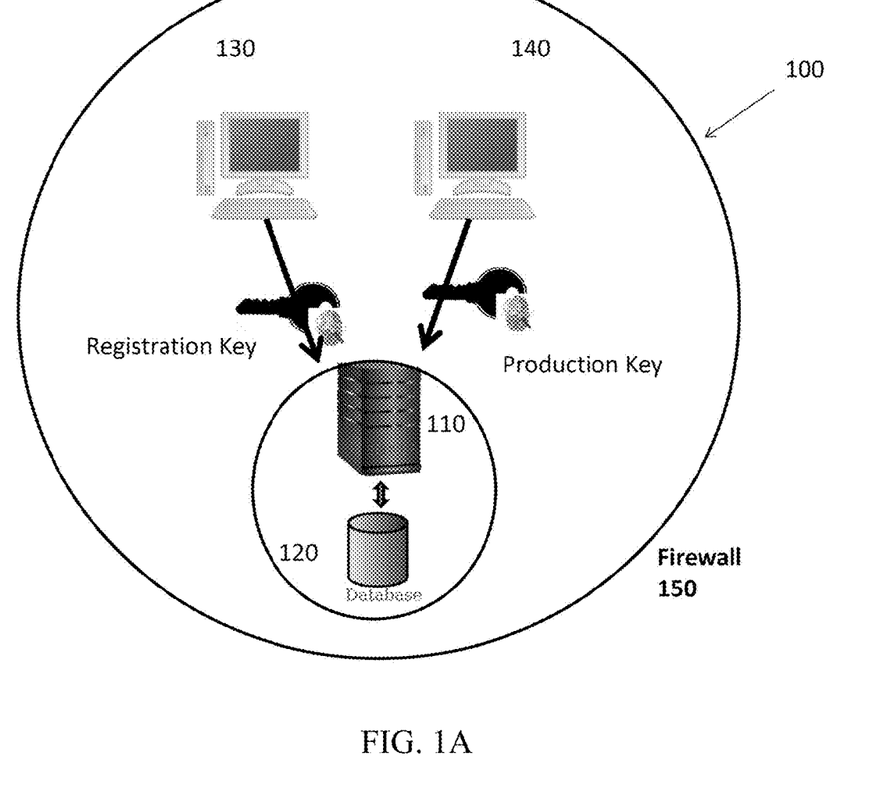
FIG. 1A-B show an exemplary systems for protecting sensitive documents.
Figure 1B:
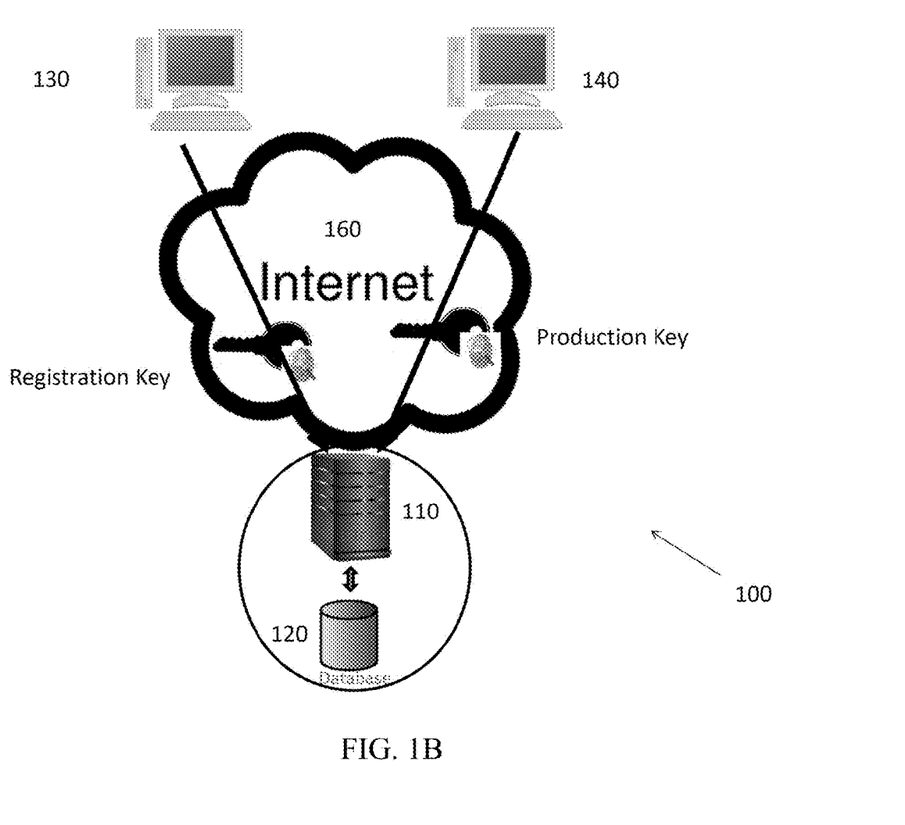

FIGS. 1A-B show exemplary systems 100*a-b* for protecting sensitive media items including documents. This system may exist in a publicly or privately maintained cloud platform, or within a server platform behind a firewall belonging to a law firm, commercial or government entity. As shown, the system 100 may comprise a server 110 and a database 120 accessible by the server. The system 100 may further include a first user interface device 130 for generating registration keys for documents (or other media items) and transmitting the registration key, which may include a digital fingerprint and metadata related to the documents to the server 110. The system 100 may further include a second user interface device 140 for generating production keys for documents and transmitting the production key, which may include a digital fingerprint and metadata related to the documents to the server 110.

As shown in FIG. 1A, in a first scenario, the system 100a may be located entirely within a firewall 150, and may be operated within a corporate, law firm, or governmental environment.

As shown in FIG. 1B, in a second scenario, the system 100b may incorporate user interface devices 130, 140, managed by individual users or owned and operated by a first party, and a server 110 and database 120 operated by a second party. The first party may communicate with the second party using the internet 160.

The interaction between these components will be discussed in more detail below with respect to a method 200 for protecting sensitive documents.

Figure 2:
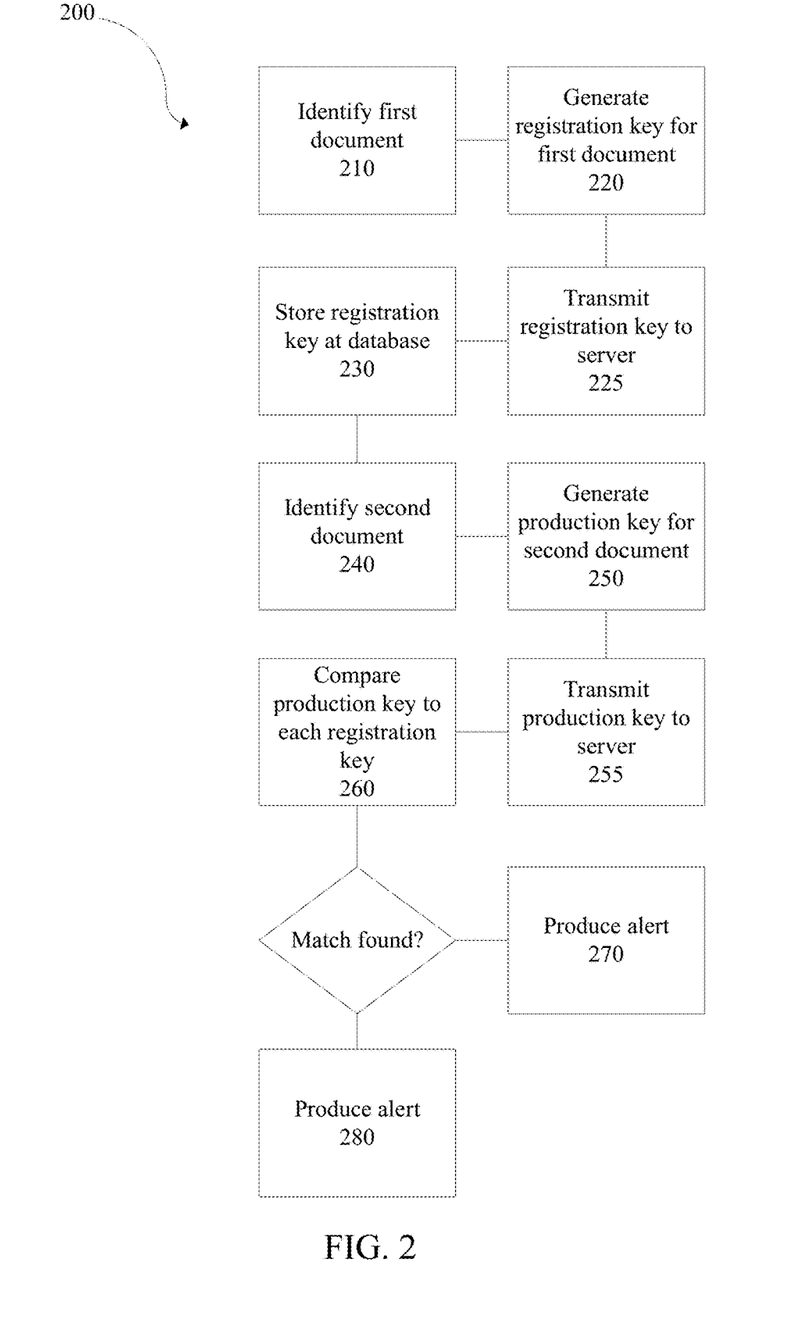
FIG. 2 is a flow chart illustrating a method for protecting sensitive documents.

FIG. 2 is a flow chart illustrating a method 200 for protecting sensitive documents operable on the system 100 of FIG. 1.

In a typical implementation of the method 200, a first user may identify (210) a first document at the first user interface device 130. The document may be a document being classified as privileged and/or sensitive for the purpose of a disclosure process, such as during litigation or for the purpose of protecting commercial and state secrets in the case of commercial and government entities respectively. While this method is discussed in terms of documents, it will be understood that other types of media items (including printed documents) are contemplated as well, and may be monitored by this method, or a platform implementing this method.

In typical embodiments, the first document may be identified (at 210) as a member of a first set of documents, such as a set of documents classified as sensitive or confidential. In other embodiments, the document may be identified and separately assigned a classification, such that a user may first identify (at 210) a document or set of documents, and separately incorporate a classification into document metadata.

In some embodiments, the documents may be identified as members of a set of documents that are being reviewed, such as those associated with a specified litigation action, and a classification may be separately incorporated into metadata.

The first user interface device 130 then generates (220) a registration key for the first document and transmits (225) the registration key to the server 110. The registration key typically includes a digital fingerprint and metadata for the first document. The metadata incorporated into the registration key may include, for example, the name of an entity recording the registration key, the name of an party and/or software application responsible for creating the document, and in some cases (as discussed), a classification for the document as confidential, sensitive, secret, etc.

The server then stores (230) the registration key for the first document at the database 120. In typical embodiments, the users may maintain firewalls between their associated interface devices and the server, and the first document is never be sent to the server. Therefore, the documents being evaluated and recorded are never transmitted outside of a user's firewall.

After the storage (at 230) of the registration key for the first document at the database 120, a second user may then identify (240) a second document at the second user interface device 140. The second user interface device 140 then generates (250) a production key for the second document and transmits (255) the production key to the server 110. The production key, like the registration key, typically includes a digital fingerprint and metadata for the second document.

As discussed with respect to the first document, the second document may be identified as a member of a second set of documents. For example, the second document may be a member of a set of documents identified as not sensitive, not confidential, or prepared for disclosure. In some embodiments, the first set of documents and the second set of documents are simply two sets of classifications of documents, such that the method monitors such classifications for inconsistent category assignments.

The production key of the second document may then be compared (260) to all registration keys stored in the database 120, including the registration key of the first document stored therein (at 230). This is performed by evaluating the production key digital fingerprint associated with the second document, and comparing it to each registration key digital fingerprint archived in the database 120.

The server then produces alerts (including but not limited to text message, SMS, and email formats) (270) to the first user (in the case of the matching registration key) and a similar alert (280) to the second user (in the case of the matching production key) if the digital fingerprint of a production key is identical to the digital fingerprint of any registration key stored in the database. In some embodiments, the alerts are generated only if the second document has been identified as a member of a set of documents conflicting with the categorization of the first set of documents. For example, if the first set of documents is documents that have been classified as privileged or confidential, and the second set of documents is those being prepared for disclosure, the server produces alerts (at 270 and 280) indicating that a document being prepared for disclosure has previously been classified as confidential.

The alerts generated (270 and 280) in these cases may contain information sufficient to identify the second document (which in this case is identical to the first document). That information may include the registration key for the first document and production key of the second document. The alert may, in some cases, include just the metadata associated with the documents (rather than the entirety of the associated keys). Such an alert may then be transmitted to the parties responsible for disclosing the documents and/or the parties responsible for classifying the documents. In some embodiments, the metadata provided as part of the keys may include contact information for use in alerting relevant parties. In other embodiments, contact information is separately recorded, such as in "action keys" as discussed below.

In some embodiments, where the metadata of a document being evaluated may include a classification as either confidential or non-confidential (among other categories), the system may further determine if the classification of the second document and the first document match prior to generating the alerts (at 270 and 280). Accordingly, if the metadata associated with the second document indicates that the second document has been classified as confidential, and thereby matches the metadata associated with the first document, no alert would be generated.

The registration key and the production key discussed with respect to the method typically include, digital fingerprints, which may be generated using, cryptographic hash functions. The document key, or the corresponding digital fingerprint, may contain less data than the document itself, making it impossible to decrypt the key and generate the original document. The digital fingerprint of the production key is typically generated (at 250) using an identical algorithm, or an algorithm providing identical results, as that for generating the digital fingerprint of the registration key (at

220). Accordingly, for identical documents, the digital fingerprint of the registration key will be identical to the digital fingerprint of the production key. The production key of the second document may then be compared to the keys for all documents recorded in the database by determining if the digital fingerprint of the production key exactly matches the digital fingerprint of any registration key in the database.

The media items, or documents, may be classified as part of a classification process through which documents, or other media items, are prepared for discovery/disclosure. The classification process may be managed by an administrator of the method, or the method may be designed to be implemented alongside a preexisting media item classification system, such as through an existing document review platform. The method may then communicate with existing document review platforms using application programming interfaces (APIs) designed for such purposes. The result of the media item classification may be a first set of media items classified as sensitive and a second set of media items classified as not sensitive.

The APIs used for integrating this method with various existing discovery platforms may extract data from load files associated with the document review platforms and insert that data into an overlay file. The purpose of this overlay file is to manage the information associated with the documents and to merge the information in the system database with the information in the existing discovery platforms.

Figure 3:
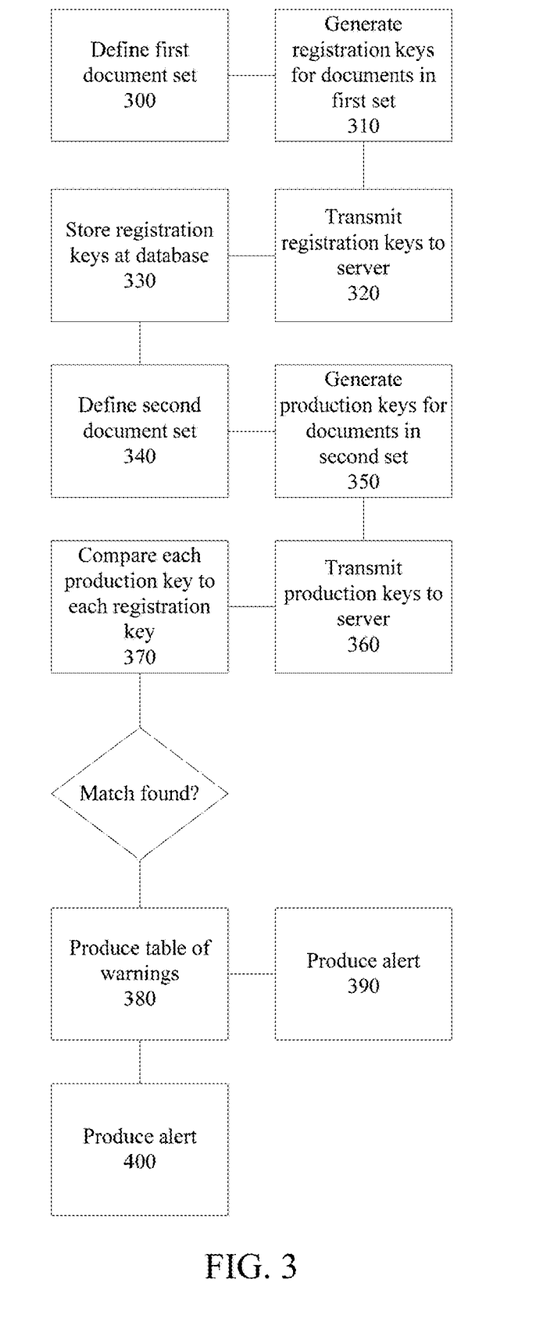
FIG. 3 is a second flow chart showing an alternate method for protecting sensitive documents.

As shown in FIG. 3, the method 200 described above with respect to FIG. 2 may be applied to batches of media items or documents in a first set and batches of media items in a second set. In such an embodiment, all documents in a first set are defined (300) and are provided with registration keys (310). The registration keys of the first set are then transmitted (320) to the server 110, which in turn stores (330) the registration keys at the database 120. All media items or documents in the second set are similarly defined (340) and provided with production keys (350). The production keys associated with the media items of the second set are then transmitted (360) to the server 110 for comparison with the registration keys generated (at 310) for the documents of the first set. These registration keys and production keys may be generated at different times, such as in long term multi jurisdictional litigation, where registration keys are uploaded to a database in a first discovery/disclosure process, and production keys are uploaded in a second discovery/disclosure process, potentially several years later. The production keys are then each compared (370) to the set of registration keys to determine if any matches exist.

If any match is found, such a match then triggers a warning (380), or a table of warnings, such as that shown in FIG. 4. The warning or table of warnings may then be incorporated into alerts produced and distributed (390, 400) to one or both parties that a media item that is scheduled to be disclosed matches a document previously classified as sensitive or confidential.

Similarly, a set of registration keys for media items classified as sensitive may be uploaded for comparison to future production keys, and a second set of production keys classified as not sensitive may be uploaded for comparison to a previous set of registration keys.

In these embodiments, only the keys generated based on the media items are uploaded, and the actual media items classified are not uploaded. Accordingly, the media items, or documents, underlying the keys are never transmitted to the server 110.

In some embodiments, the first set of media items comprises all media items classified in a process, rather than only those classified as sensitive, and the second set of media items may be any media items classified in a second classification process, rather than only those scheduled to be disclosed. For any match uncovered by the method, the system may then determine whether a media item had previously been classified as sensitive and is now scheduled to be disclosed, or is now being classified as non-sensitive. Similarly, the system may determine if the media item had previously been disclosed, or classified as non-sensitive and is now being classified as sensitive. In this way, a user of the system may be alerted to any inconsistency across multiple classifications.

As discussed above, the algorithm for generating the digital fingerprint as part of the production key may be the same as, or produce the same results as, the algorithm for generating the digital fingerprint as part of the registration key. This algorithm may be for generating a digital fingerprint using a cryptographic hash function taking as input all or part of a document. The digital fingerprint may contain less information than the original files, such that the digital fingerprint cannot be decrypted. While a digital fingerprint is discussed, it is not intended to limit the encryption method to any specific type of digital fingerprinting. Accordingly, any encryption method, or method for generating a unique identifier for a media item, may be used in its place.

In some embodiments, media formats or content may change over the course of a classification process, and differently formatted media files may generate different keys, and may have different digital fingerprints. Accordingly, registration keys may be produced or updated at various steps during the classification process, such that each media item registered contains several digital fingerprints. For example, a first digital fingerprint may be associated with a native version of the media item (e.g. .docx, .xlsx etc.), a second digital fingerprint may be associated with a near-native version (.html), and a third version may be associated with a tiff or pdf version of the media item. Accordingly, when production keys are generated, keys may again be generated at various stages of the process, and the system may then check if any digital fingerprint generated during the production portion of the process matches any digital fingerprint generated during the registration portion of the process.

Additional methods may be applied to media items in the creation of the various keys. The media items may, for example, be distilled or filtered in order to produce keys that are based solely on content and independent of format. In comparing documents, bates stamp numbers may be associated with each media item and may be used to assist in the comparison as well.

In uploading a batch of files, such as registration keys for media item registration, the keys may be associated with an "action key" or a key tying the media items to a specific court case, client, or other classification (such as identifying that the media items belong to a particular commercial or government entity). A second batch of files, such as those containing production keys, may be compared only to registration keys for files associated with a related action key.

In some embodiments, where a second user uploads a production key to the server, the server compares the production key uploaded to all registration keys stored in the database, or all registration keys determined to be relevant based on metadata, and produces alerts if any keys are found to be identical. The metadata may be used to determine relevance based on, for example, identifying a related matter or event that the documents are associated with.

When the method evaluates a large number of media items, it may identify a large number of media items in the first set and generate registration keys for each of them. It may then identify a large number of media items in the second set and generate a production key for each of them. It may then compare each production key to each registration key and identifies any identical keys, or any identical digital fingerprints contained in the keys. The system may then provide a table of results to a user, such as an attorney or a law firm, associated with each set of documents. Such a table may show a list of sample media items, each of which is a document encoded behind a registrant firewall. In such a scenario, some data, such as the digital fingerprint and some portion of the metadata for the file, may be stored in an administration database. This data may be only the digital fingerprint and contact information for the registrant and the producer so that alerts may be routed when necessary.

When a producer uploads a production key incorporating a digital fingerprint to the server, the method, running on an administrator's system, compares the key to a set of digital fingerprints in the database, and highlights any overlap (which may be shown in red). The information for the media item associated with the digital fingerprint may then be collated in an alert to be sent to the relevant parties. The alert may simply inform the relevant parties of an issue so that the parties can confer to resolve the issue.

The platform described, or an included variation thereof, may be used to track and secure confidential or sensitive documents prepared in the ordinary course of business within, for example legal, corporate, or governmental entities. In some embodiments, all documents, or other media items, produced within a certain context, such as those generated in a corporate or government environment, may be registered with a registration system. In such an embodiment, any time a document or other media item is generated or modified, it may be passed through a utility for generating a registration key, and those registration keys may then be maintained in a centralized database. In some environments, all documents may be recorded in this way. In other environments, only sensitive or confidential documents may be recorded and maintained in this way.

In such an embodiment, any time a task that may compromise the confidentiality of a specified document is performed within the corporate environment, the document may again be passed through a utility to generate the equivalent of the production keys discussed above. Such tasks may be, for example, the emailing of a document, the transferring of a document to a flash drive, a file sharing web site, a personal computer, or otherwise downloading or transporting the document. The utility described may be incorporated into an email utility such that any time a document is to be emailed, the document may be checked against the database of potentially sensitive or confidential documents.

Accordingly, if an employee within the corporate environment tries to download or transmit confidential information or documentation, the platform will generate a production key, compare it to the registration keys, and if the information is indeed confidential, alert an appropriate party and potentially quarantine the relevant sensitive media item pending further investigation. In some such scenarios, the production key metadata may further include the name of an entity, person, or software application responsible for modifying, copying, forwarding, or otherwise transporting the document. Any alert triggered by such a platform may be distributed to an appropriate party, such as to senior management of the entity securing the document.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially generated propagated signal, e.g., a machine-generated electrical, optical, or electromagnetic signal that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" and like terms encompass all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Computers may further be provided in other forms, such as in the form of handheld devices or smartphones, as well as in the form of tablet devices. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser. A device for providing interaction with a user may be referred to as a user interface device.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an internetwork (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

While the present invention has been described at some length and with some particularity with respect to the several described embodiments, it is not intended that it should be limited to any such particulars or embodiments or any particular embodiment, but it is to be construed with references to the appended claims so as to provide the broadest possible interpretation of such claims in view of the prior art and, therefore, to effectively encompass the intended scope of the invention. Furthermore, the foregoing describes the invention in terms of embodiments foreseen by the inventor for which an enabling description was available, notwithstanding that insubstantial modifications of the invention, not presently foreseen, may nonetheless represent equivalents thereto.

What is claimed is:

1. A computer based method of protecting sensitive documents, the method comprising:
    receiving, at first user interface device, a first set of documents;

identifying a first document in the first set of documents;
generating a registration key associated with the first document;
receiving, at a second user interface device, a second set of documents;
identifying a second document in the second set of documents;
generating a production key associated with the second document;
receiving, at a server, the registration key and the production key but not the first of second set of documents; and
producing an alert if a segment of the production key is identical to a segment of the registration key;
wherein a method implemented to generate the segment of the registration key and a method implemented to generate the segment of the production key generate identical results when applied to identical documents.

2. The computer based method of claim 1 wherein the first set of documents comprises documents that have been identified as sensitive at the first user interface device, and wherein the second set of documents comprises documents that have been identified as not sensitive at the second user interface device.

3. The computer based method of claim 2 wherein a first user has identified the first set of documents as sensitive at the first user interface device and a second user has identified the second set of documents as not sensitive at the second user interface devive.

4. The computer based method of claim 1 further comprising:
generating a plurality of registration keys such that each registration key is associated with a corresponding document of the first set of documents;
generating a plurality of production keys such that each production key is associated with a corresponding document of the second set of documents,
receiving, at the server, the plurality of registration keys and the plurality of production keys, and
producing the alert if a segment of any of the production keys is identical to a segment of any of the registration keys.

5. The computer based method of claim 4 wherein the alert is a listing of any documents having the segment of its corresponding production key matching the segment of any registration key.

6. The computer based method of claim 5 wherein the alert includes identifying information for identifying each document having the segment of its production key matching the segment of any registration key or having the segment of its registration key matching the segment of any production key in both the first set of documents and the second set of documents.

7. The computer based method of claim 1 wherein the segment of the registration key is a registration digital fingerprint generated from at least a portion of the first document, and wherein the segment of the production key is a production digital fingerprint generated from at least a portion of the second document.

8. The computer based method of claim 1 further comprising:
associating each document with an event, and
transmitting the alert to a user associated with the event associated with the second document.

9. The computer based method of claim 1 wherein the segment of the registration key is generated by a cryptographic hash function that takes as input a portion of the first document and the segment of the production key is created by the cryptographic hash function that takes as input a corresponding portion of the second document.

10. The computer based method of claim 1 wherein the registration key contains less information than the first document.

11. The computer based method of claim 1 further comprising associating the first document with a first action key identifying a first legal action and associating the second document with a second action key identifying a second legal action and producing an alert only if the first legal action is associated with the second legal action.

12. The computer based method of claim 1 wherein the first document is a member of a first set of documents marked as sensitive and the second document is a document being modified or distributed.

13. The computer based method of claim 12 wherein the generation of the production key is triggered as a result of one of:
transferring the second document to a flash drive;
uploading the second document to a website;
transmitting the second document by email; or
downloading the document to a personal computer.

14. A system for protecting sensitive documents comprising:
a server;
a database;
a first user interface device; and
a second user interface device,
wherein a first set of documents is identified at the first user interface device;
a first document is identified at the first user interface device as a member of the first set of documents;
a first user interface device generates a registration key comprising a digital fingerprint and metadata for the first document, and transmits the registration key to the server, and wherein the first document is not transmitted to the server;
the server stores the registration key and the metadata for the first document at the database;
a second set of documents is identified at the second user interface device;
a second document is identified at the second user interface device as a member of the second set of documents;
the second user interface device generates a production key comprising a digital fingerprint and metadata for the second document and transmits the production key to the server, and wherein the second document is not transmitted to the server; and
the server produces an alert if the digital fingerprint of the production key is identical to any digital fingerprint of a registration key stored in the database,
wherein the alert comprises the registration key for the first document or the production key of the second document.

15. The system of claim 14 wherein the first set of documents comprises documents that have been identified as sensitive, and wherein the second set of documents comprises documents that have been identified as not sensitive.

16. The system of claim 14 wherein the second document is identified at the second user interface device as a document to be modified or distributed.

17. The system of claim 16 wherein the second user interface device is configured to generate the production key when performing one of:
transferring the second document to a flash drive;

uploading the second document to a website;
transmitting the second document by email; or
downloading the document to a personal computer.

\* \* \* \* \*